United States Patent [19]

Dunnavant et al.

[11] Patent Number: 4,526,219
[45] Date of Patent: Jul. 2, 1985

[54] PROCESS OF FORMING FOUNDRY CORES AND MOLDS UTILIZING BINDER CURABLE BY FREE RADICAL POLYMERIZATION

[75] Inventors: William R. Dunnavant; Heimo J. Langer, both of Columbus; Grant O. Sedgwick, Gahanna, all of Ohio

[73] Assignee: Ashland Oil, Inc., Ashland, Ky.

[21] Appl. No.: 431,962

[22] Filed: Sep. 30, 1982

Related U.S. Application Data

[63] Continuation of Ser. No. 314,649, Oct. 26, 1981, abandoned, which is a continuation of Ser. No. 110,025, Jan. 7, 1980, abandoned.

[51] Int. Cl.³ .................... B22C 9/02; B22C 1/20
[52] U.S. Cl. .................... 164/16; 164/525; 523/139
[58] Field of Search .................... 164/525, 527, 16; 260/998.18, 42, 42.11; 523/139

[56] References Cited

U.S. PATENT DOCUMENTS

| | | | |
|---|---|---|---|
| 2,765,507 | 10/1956 | Wolf et al. | 164/527 |
| 2,817,128 | 12/1957 | Wickett | 164/525 |
| 2,923,701 | 2/1960 | Schuller et al. | 260/998.18 X |
| 3,007,893 | 11/1961 | TePas | 260/998.18 X |
| 3,008,205 | 11/1961 | Blaies, Jr. | |
| 3,108,340 | 10/1963 | Peters et al. | |
| 3,145,438 | 8/1964 | Kottke et al. | |
| 3,179,523 | 4/1965 | Moren | 164/525 X |
| 3,179,990 | 4/1965 | Freeman | |
| 3,184,814 | 5/1965 | Brown | |
| 3,194,678 | 7/1965 | Caldwell | |
| 3,255,164 | 6/1966 | Visger et al. | |
| 3,266,108 | 8/1966 | Dunning et al. | 164/527 |
| 3,333,021 | 7/1967 | Geipert | |
| 3,458,613 | 7/1969 | Andrews et al. | |
| 3,489,599 | 1/1970 | Krieble | 117/132 |
| 3,590,018 | 6/1971 | Gebura | |
| 3,639,654 | 2/1972 | Robins | |
| 3,645,937 | 2/1972 | Lang et al. | 260/998.18 X |
| 3,661,620 | 5/1972 | Dekking et al. | |
| 3,692,653 | 9/1972 | Drelich et al. | |
| 3,879,339 | 4/1975 | Richard | 260/38 |
| 3,983,071 | 9/1976 | Jurisch | 260/42 |
| 3,986,546 | 10/1976 | Green et al. | 164/525 |
| 4,070,334 | 1/1978 | Green | 260/42.53 |
| 4,106,944 | 8/1978 | Epstein | 164/525 X |
| 4,174,311 | 11/1979 | Nakano et al. | 260/28.5 R |
| 4,176,114 | 11/1979 | Stewart et al. | 260/42.29 |

FOREIGN PATENT DOCUMENTS

| | | |
|---|---|---|
| 247003 | 1/1961 | Australia . |
| 14666 | 11/1971 | Australia . |
| 1053440 | 5/1979 | Canada . |
| 1570452 | 2/1970 | Fed. Rep. of Germany . |
| 1608337 | 7/1970 | Fed. Rep. of Germany . |
| 49-102515 | 9/1974 | Japan . |
| 51-45616 | 4/1976 | Japan . |
| 55-10320 | 1/1980 | Japan . |
| 603325 | 6/1948 | United Kingdom . |
| 603546 | 6/1948 | United Kingdom . |
| 782383 | 9/1957 | United Kingdom . |
| 784991 | 10/1957 | United Kingdom . |
| 824677 | 12/1959 | United Kingdom . |
| 934900 | 8/1963 | United Kingdom . |
| 971597 | 9/1964 | United Kingdom . |
| 974698 | 11/1964 | United Kingdom . |
| 983405 | 2/1965 | United Kingdom . |
| 1006721 | 10/1965 | United Kingdom . |
| 1029320 | 5/1966 | United Kingdom . |
| 1046679 | 10/1966 | United Kingdom . |
| 1055242 | 1/1967 | United Kingdom . |
| 1106191 | 3/1968 | United Kingdom . |
| 1206051 | 9/1970 | United Kingdom . |
| 1208496 | 10/1970 | United Kingdom . |
| 1510645 | 5/1978 | United Kingdom . |

OTHER PUBLICATIONS

Mazzolini, C. et al., "Catalytic System for Low Temperature Polymerization of Vinyl Chloride", in *Ind. Eng. Chem. Prod. Res. Develop.*, vol. 9, No. 4, 1970, pp. 504–511.

*Primary Examiner*—Nicholas P. Godici
*Assistant Examiner*—J. Reed Batten, Jr.
*Attorney, Agent, or Firm*—Pollock, Vande Sande & Priddy

[57] ABSTRACT

A binder is formed by polymerizing or hardening a binding material or composition, an unsaturated polymer or unsaturated monomer or mixtures thereof (polymer solution), wherein at least part of the unsaturation is ethylenic, preferably of vinyl or acrylic type, by free radical polymerization. The free radical polymerization is caused by contacting the unsaturated binding material with a free radical initiator comprising a peroxide and catalytic agent. In the preferred embodiment the binding material is a solution of an ethylenically unsaturated polymer in a solvent of unsaturated monomeric compound or compounds, in which vinyl or acrylic unsaturation is present. The binder is formed upon polymerization which occurs when the unsaturated monomer, polymer or polymer solution is exposed to the free radical initiator. Subjection of the unsaturated monomer, polymer or polymer solution to the initiator begins the formation of free radicals and subsequently the binding composition is polymerized to form the binder. This binder has been found to be especially suitable as a foundry binder of the cold box type wherein a room temperature, rapid gas cure is utilized. The gas, preferably sulfur dioxide, serves as the catalytic agent of the free radical initiator. Cores made using this binder are especially useful in casting aluminum and other lightweight metals because the binder collapses readily after casting of these metals to provide complete shakeout of the core without application of external energy. The binder also has application to make cores used in casting iron.

20 Claims, No Drawings

PROCESS OF FORMING FOUNDRY CORES AND MOLDS UTILIZING BINDER CURABLE BY FREE RADICAL POLYMERIZATION

This application is a continuation of application Ser. No. 314,649, filed Oct. 26, 1981 which application was a continuation of application Ser. No. 110,025 filed Jan. 7, 1980, both now abandoned.

DESCRIPTION OF THE PRIOR ART

Many different types of binding materials have found use in foundry core making and mold making operations. The binding material upon hardening should impart to the core and molds various desirable properties. Examples of such properties are erosion resistance, humidity resistance and collapsibility or shake-out. In core making or mold making, high production is also a desired goal.

Modern core making and mold making techniques began with the use of unsaturated drying oils derived from natural products as binding material. Linseed oil is the foremost example of a drying oil. On exposure to air, linseed oil and other unsaturated oils undergo oxidatively initiated polymerizations resulting in formation of solid, highly cross-linked structures. Polymerization can be accelerated by heat or by chemical methods. These binding materials are known in the industry as core oils. In forming a core, the oil is mixed with sand and the sand mixture is shaped into the form of a core or mold. Hardening is accomplished by heating or aging the core or mold for a long period of time. Binders based on core oil, in addition to the oil component, may contain other components such as oil derived esters, unsaturated hydrocarbon resins and solvents. Core oil based processes for forming foundry shapes such as molds and cores have been known for fifty to sixty years.

Processes which are faster than the aforementioned core oil processes were introduced 25 to 30 years ago. These processes require heat cure for the binding material. These hot-box core processes are based upon thermal setting resin compositions. Chemically these thermosetting resins include phenol-formaldehyde resins, urea-formaldehyde resins and furfuryl alcohol-formaldehyde resins. In addition to the using heat to cure or polymerize these binding materials, acids are often incorporated as catalysts.

About ten years ago room temperature, high speed processes for the production of foundry cores and molds were introduced. The binder formed by these processes is based on urethane chemistry. In essence, the binding material consists of two liquid resin components. One component is a phenol-formaldehyde resin. The second component is a polymeric isocyanate. The phenolic and the isocyanate resins are mixed with sand and may be used in either a "cold box" or a "no bake" system. In the cold box system, the sand which has been coated with the two components is blown into a core box. Once the sand mixture is blown into a core box a gaseous tertiary amine is passed through the core box to cause an instantaneous cure or solidification to form the binder. U.S. Pat. No. 3,409,579 is illustrative of the technology. In no bake type core making procedure the polyisocyanate component, the phenolic resin component and a catalyst are all mixed with sand at the same time. The sand mix is then poured into a core box or pattern. The sand mix remains fluid for a period of time. After this period has elapsed, the catalyst initiates the curing or polymerization and the core is rapidly formed as the binding components quickly react to form a urethane binder. No bake binders are taught by U.S. Pat. No. 3,676,392.

A further binding composition and procedure for forming a foundry binder is described in U.S. Pat. No. 3,879,339. In this patent there is described a cold box, i.e., room temperature, gas curable method of forming a foundry binder involving an organic resin which is acid curable and an oxidizing agent. This binding component is cured with sulphur dioxide gas. The combination of sulphur dioxide plus the oxidizing agent, leads to the formation of sulfuric acid, the acid serves to cure the acid curable organic resin. In essence, sulphuric acid is formed in situ and the acid reacts with the resin. Thus curing of the binding composition is accomplished. p None of the above described foundry binders are of such utility and versatility that they are viewed as a universal or irreplaceable foundry binder. Each has advantages and disadvantages to some degree.

Therefore it is the object of the invention to provide a new binder based upon chemistry heretofore not applied in foundries or in other fields of binder use. It is a special object to provide a foundry binder of the cold box type which exhibits rapid cure. Another object is to provide a cold box binder useful in casting aluminum and other light metals.

BACKGROUND OF THE INVENTION

This invention relates to binders preferably cured at room temperature which are formed by mixing (a) a binding composition or material comprising ethylenically unsaturated monomers, ethylenically unsaturated polymers and blends of such unsaturated monomers, ethylenically unsaturated polymers and blends of such unsaturated monomers and polymers, and (b) a free radical initiator comprising a peroxide and a catalytic agent. In general, this invention relates to room temperature curable binding compositions which are polymerizable through free radical initiation and chain extension. These binding compositions are useful in adhering materials and especially particulate solids. In particular, the invention relates to compositions which are capable of bonding sand or other aggregates to form molds or cores for casting metals, including especially aluminum and other lightweight metals. Molds and cores made using these binders demonstrate superior collapsibility when used in casting lightweight metals, i.e., metals which are cast at low casting temperatures. The curing of the binding material to form the binder composition preferably takes place at ambient temperature and is accomplished by a free radical initiator comprising a peroxide and a catalytic agent. In preferred form, the catalytic agent is gaseous and the cure or hardening is nearly instantaneous. However, selection of differing catalytic agents results in a variety of options for the manner and rate of cure.

DETAILED DESCRIPTION AND PREFERRED EMBODIMENT OF INVENTION

This invention pertains to a foundry binder in which the chemistry is unlike that used to form any binder which has heretofore been known to be useful in the foundry industry. The binder also has application as a binder or binding agent in fields other than the foundry industry. The chemistry on which this binder is based is analogous to a degree to chemistry which has heretofore been utilized in coatings, see for example, British Pat. No. 1,055,242, and adhesives, see for example various patents assigned to Loctite Corporation. An anaerobically cured foundry binder based on similar chemistry is described in Canadian Pat. No. 1,053,440. This binder cures very slowly and involves the necessity of heating to accomplish cure. Applicants' invention does not encompass an anaerobic curing process and involves rapid, almost instantaneous, curing at room temperature with certain catalytic agents.

It is well known that foundry shapes, that is cores and molds, are formed by disbursing on sand or another aggregate material a binding substance or chemical, shaping the sand into the desired shape and allowing or causing the binding substance or chemical to harden to form a binder. The present invention can be thought of in terms of as a binder which results from bringing together two parts. Part I is a binding substance or composition which undergoes polymerization and crosslinking to adhere, hold or bind the sand or other aggregate in the desired shape. The second part (Part II) is an agent which causes the polymerization and crosslinking of Part I to take place. This agent is referred to herein as the "free radical initiator". As used in this description the term "crosslink" indicates a chain build up which results when a polymer is involved either by linking with another polymer or with a monomer. The term "polymerization" includes "crosslink" but also applies to the chain extension which involves only monomers.

Part I of the binder system can be described as an unsaturated composition which is cross linkable or polymerizable by free radical mechanism. The unsaturation is preferably terminal or pendent. Still internal unsaturation is acceptable and polymerization will result upon combination with Part II. It is also feasible, depending upon the manner of synthesis of the Part I component, to have a Part I component having both terminal and/or pendent unsaturation and also internal unsaturation in the same component. Applicants believe the polymerization mechanism is nearly all of the free radical type when crosslinking compositions (i.e., unsaturated polymer(s)) are involved. When certain monomers are used as the binding composition it is possible that a portion of the polymerization may take place by a mechanism other than free radical. It is to be understood therefore that the description contained herein sets forth applicants' best belief as to the mechanism for polymerization and that "free radical mechanism" is used for convenience and accurately describes such mechanism in nearly all instances. However, it is to be understood that in addition to the free radical mechanism other mechanisms may also be involved in the polymerization under certain circumstances. Curing is accomplished using Part II, a free radical initiator, which comprises a peroxide and a catalytic agent. It has been discovered that unsaturated reactive monomers, polymers and mixtures thereof (i.e., the binding composition) can be used as a binding material which is instantaneously curable upon selection of certain catalytic agents for the free radical initiator. The unsaturation found in the monomers and polymers is preferably of the ethylenic type. For example reactive polymers, which can also be described as oligomers or as adducts, which contain preferably vinyl or acrylic unsaturation are used as binding compositions which upon polymerization make a binder for foundry cores or molds from sand. The free radical initiator (Part II) is mixed with the reactive polymer or monomer (Part I) and forms free radicals which polymerize the binding composition to form the binder. This combination of a peroxide and a catalytic agent, which agent in addition to being chemical in nature may also be a form of energy, is referred to herein as a "free radical initiator".

The free radical initiator described herein can be used to cause polymerization of Part I materials in a number of manners. For example, the peroxide can be mixed with the Part I material and this mixture disbursed uniformly on sand. After the sand is shaped as desired, the shaped and can be exposed to the catalytic agent. Alternatively, the catalytic agent can be added to the Part I material and this mixture used to coat sand and the coated sand then shaped as desired. The peroxide component of the free radical initiator can then be added to the shaped article and hardening through polymerization will occur. It is also possible to divide the Part I material into two portions. The catalytic agent could be added to one portion and the peroxide could be added to the second portion. Upon combining the two portions, after applying at least one portion with the material to be bonded, polymerization occurs. Depending upon the type of catalytic agent or equipment and application utilized this last method may not be practicable. However, if the binding material is used to adhere nonparticulate materials this last method may be particularly useful. Selection of various catalytic agents has a large influence upon the means that can be used to polymerize the binding material and upon the rate at which the binding material is cured. For example, selection of the proper catalytic agent enables the user of the binding material to instantaneously polymerize the material at room temperature or to delay the polymerization for some time and finally achieve polymerization at elevated temperatures. The availability of options for selecting conditions at which the binding composition polymerizes is deemed significant.

As described above, the Part I binding material is a polymerizable, unsaturated, monomer, polymer or mixture of such monomer(s) and such polymer(s). Examples of materials which are suitable monomeric compounds for the Part I component include a wide variety of monofunctional, difunctional, trifunctional and tetrafunctional acrylates. A representative listing of these monomers includes alkyl acrylates, hydroxyalkyl acrylates, alkoxyalkyl acrylates, cyanoalkyl acrylates, alkyl methacrylates, hydroxyalkyl methacrylates, alkoxyalkyl methacrylates, cyanoalkyl methacrylates, N-alkoxymethylacrylamides, and N-alkoxymethylmethacrylamides. Difunctional monomeric acrylates include hexanediol diacrylate and tetraethylene glycol diacrylate. Other acrylates which can be used include trimethololpropane triacrylate, methacrylic acid and 2 ethylhexyl methacrylate. It is preferred to use poly functional acrylates when the monomer is the only binding species in the binder system. As previously mentioned when only monomers are used as the binding material crosslinking may not occur. Also some mechanism beside a free radical mechanism may cause polymerization.

Examples of unsaturated reactive polymers which have been found to be especially useful in forming this foundry binder are epoxy acrylate reaction products, polyester/urethane/acrylate/reaction products, polyether acrylates, and polyester acrylates. Unsaturated polymers which find use as a Part I composition include commercially available materials such as UVITHANE 782 and 783, acrylated urethane oligomers from Thiokol and CMD 1700, an acrylated ester of an acrylic polymer and CELRAD 3701, an acrylated epoxy resin both available from Celanese. Reactive polymers can be formed in a number of manners. One preferred method of preparation of the reactive polymers is to form an isocyanate terminated prepolymer by reacting a polyhydroxy compound or polyol with a diisocyanate. The prepolymer is further reacted with a hydroxyalkyl acrylate to form an oligomer. A second approach which has been found to be beneficial is to react a polyisocyanate compound, preferably a diisocyanate compound, with an hydroxyalkyl acrylate. The reaction product is an "adduct" of these two materials. In addition oligomers and adducts may be prepared simultaneously under appropriate conditions.

In addition to the reactive unsaturated polymer, a solvent, preferably of a reactive nature, may be included and preferably is included as a component of the binding material. Depending upon the nature of the unsaturated binding material inert solvents may also be used. The preferred solvent is an unsaturated monomeric compound such as that described above in the recitation or monomeric Part I materials. Accordingly the Part I material may comprise a mixture of those unsaturated monomers and unsaturated polymer which have previously been suggested for use as Part I materials per se. Best results occur when a solution of an unsaturated reactive polymer and a monomeric unsaturated solvent is used. This combination appears to be more readily capable of copolymerization and crosslinking to form a binding matrix required either to adhere sand or other aggregates together thereby forming the foundry core or mold or to bond other materials.

As stated, it is preferred to use in Part I of the binder system an unsaturated monomeric compound as solvent in addition to the unsaturated polymer. As described above these monomers contain unsaturation and are crosslinkable with the polymer in addition to serving as a solvent for the unsaturated polymer. Any of the unsaturated monomers (or combination thereof) which were described as being useful Part I materials per se are also useful as solvents. Ethylenic unsaturation preferably of the vinyl or acrylic type, is recommended. Examples of favored monomers, to be used as solvents for the unsaturated polymers, include pentaerythritol triacylate, trimethylolpropane triacrylate, 1,6-hexanediol diacrylate, and tetraethylene glycol diacrylate which used as a solvent for the unsaturated polymer. The amount of monomer in Part I can be 0 up to 100% based upon the total weight of Part I binding composition.

It is possible to use the reactive polymer as the Part I material and the free radical initiator without any solvent, including unsaturated monomer, being present for the unsaturated polymer. It is also feasible to use the unsaturated monomer as the Part I material with a free radical initiator but without the reactive polymer in order to get a polymerized binder. Neither of the two above described combinations are preferred. As previously stated the preferred binder system is Part I comprising a reactive unsaturated polymer dissolved in a reactive diluent, preferably a monomeric unsaturated solvent and Part II comprising a free radical initiator.

The free radical initiator is comprised of two components. The first component is preferably an organic peroxide. However, it is contemplated that any substance can be used as the first component which will form free radicals upon exposure to a catalytic agent, could be used with the free radical polymerizable Part I binding material unsaturated polymers, monomers and mixtures thereof described above. Peroxide level can vary over wide limits depending to some extent upon the catalytic agent used. However, in general it can be said that 0.5% to 2% peroxide based upon the weight of the binding material (Part I) will produce satisfactory binding under most conditions. Examples of preferred peroxides include t-butyl hydroperoxide, cumene hydroperoxide and methyl ethyl ketone peroxide. It is worthy of note that hydroperoxides are much preferred over peroxide. Inconsistent curing has been observed using peroxide. Mixtures of peroxides and hydroperoxides and mixtures of hydroperoxides are useful.

The catalytic agent component of the free radical initiator is preferably chemical in nature, preferably sulfur dioxide in gaseous form. Other chemical catalytic agents which are thought to have some practical utility include amines and $NO_2$. Once again it should be noted that a change of the catalytic agent can have a vivid influence upon the rate of polymerization. However, other non-chemical agents which interact with the peroxide component of the free radical initiator may also be of utility. For example, heat, an approximate minimum temperature of 140° F., can interact with peroxide to form free radicals which serve to polymerize the Part I materials. Increasing the temperature tends to increase the polymerization and cause faster cure. The polymerization takes place without the presence of a chemical catalytic agent.

In preferred foundry practice, the unsaturated reactive polymer, monomer or mixtures thereof and the peroxide component of the free radical initiator are mixed with sand in a conventional manner. The sand mix is then formed into a desired foundry shape by ramming, blowing or other known foundry core and mold making methods. The shaped article is then exposed to the catalytic agent component of the free radical initiator. In the preferred method of this invention gaseous $SO_2$ is used as the catalytic agent of the free radical initiator. This gas is present only in catalytic amounts as previously stated. The exposure time of the sand mix to the gas can be as little as ½ second or less and the binder component cures on contact with the catalytic agent. When $SO_2$ is used as the catalytic agent in a foundry cold box process it is suspended in a stream of carrier gas in a known manner. The carrier gas is usually $N_2$. As little as 0.5% $SO_2$ based upon the weight of the carrier gas is adequate to cause polymerization. It is also feasible to expose $SO_2$ to the binder component without the presence of any carrier gas.

Part I may also contain optical optional ingredients. For example additives for wetting and defoaming may be useful. Silanes have been found to be especially useful additives. Especially preferred are unsaturated silanes, for example vinyl silanes.

Advantages of this binding composition as a foundry binder are the following. The collapsibility of the binder used for casting aluminum is excellent. It has been found that this binder will readily collapse or shake out of an aluminum casting with the application of a minimum of external energy. The binder also provides good strength properties. The bench life of sand mixed with Part I is lengthy. The surface finish of castings made using this binder and process has been found to be very good. The production rate of cores and molds made using this binder system is rapid especially when $SO_2$ gas is used as the catalytic agent.

A foundry utilizing the binder composition which is described herein will mix Part I and one component of the free radical initiator, preferably the peroxide, with sand or other suitable foundry aggregate in a known manner. The sand mix is then formed into the desired foundry shape, cores or molds, in known manner. The sand mix is then exposed to the second component of the free radical initiator, preferably the catalytic agent which is preferably sulfur dioxide gas, and polymerization of the Part I binding material immediately occurs to form the binder of this invention.

The present invention is further illustrated by the following examples in which, unless otherwise indicated, all parts are by weight and all percentages are weight percentages.

EXAMPLE 1

Gel tests were conducted on various unsaturated monomers and polymers to determine their tendency to polymerize and the speed of polymerization. In carrying out the tests from about 1.5 to 2 grams of unsaturated monomer or polymer (i.e. Part I) were mixed with 0.03 grams of t-butylhydroperoxide (the peroxide component of the free radical initiator). This mixture was then exposed to $SO_2$ gas (the catalytic agent of the free radical initiator) either by dispersing the gas in the liquid (bubbling) or by creating an $SO_2$ atmosphere above the liquid (contacting). The results, set forth below, indicate that all unsaturated monomers and polymers polymerize. Thus all the listed compounds are potential binders. Those listed compounds which demonstrated rapid polymerization or gelling are of greatest potential foundry binders for use in foundry high speed cold box mold and core making.

| PART I | FINDING OF POLYMERIZATION |
|---|---|
| Acrylic Acid | Rapid, on contact with $SO_2$ |
| Ethyl Acrylate | Slow, on contact with $SO_2$ |
| n-Butyl Acrylate | Slow, on contact with $SO_2$ |
| Isobutyl Acrylate | Slow, on contact with $SO_2$ |
| 2-Ethylhexyl Acrylate | Rapid, on contact with $SO_2$ |
| Isobutyl Acrylate | Rapid, on contact with $SO_2$ |
| 2-Ethoxyethyl Acrylate | Rapid, on contact with $SO_2$ |
| Ethoxyethoxyethyl Acrylate | Rapid, on contact with $SO_2$ |
| Butoxyethyl Acrylate | Rapid, on contact with $SO_2$ |
| Hydroxyethyl Acrylate | Rapid, on contact with $SO_2$ |
| Hydroxypropyl Acrylate | Rapid, on contact with $SO_2$ |
| Gylcidyl Acrylate | Rapid, on contact with $SO_2$ |
| Dimethylaminoethyl Acrylate | Rapid, on contact with $SO_2$ |
| Cyanoethyl Acrylate | Rapid, on contact with $SO_2$ |
| Diacetone Acrylamid in Methanol, 50% | Rapid, on contact with $SO_2$ |
| Acrylamid in Methanol, 50% | Rapid, on contact with $SO_2$ |
| (N—Methylcarbamoyloxy)ethyl Acrylate | Rapid, on contact with $SO_2$ |
| Methylcellosolve Acrylate | Rapid, on contact with $SO_2$ |
| Phenoxyethyl Acrylate | Rapid, on contact with $SO_2$ |
| Benzyl Acrylate | Rapid, on contact with $SO_2$ |
| Ethylene Glycol Acrylate Phthalate | Rapid, on contact with $SO_2$ |
| Melamine Acrylate | Rapid, on contact with $SO_2$ |
| Diethylene Glycol Diacrylate | Rapid, on contact with $SO_2$ |
| Hexanediol Diacrylate | Rapid, on contact with $SO_2$ |
| Butanediol Diacrylate | Rapid, on contact with $SO_2$ |
| Triethylene Glycol Diacrylate | Rapid, on contact with $SO_2$ |
| Tetraethylene Glycol Diacrylate | Rapid, on contact with $SO_2$ |
| Neopentyl Glycol Diacrylate | Rapid, on contact with $SO_2$ |
| 1, 3-Butylene Glycol Diacrylate | Rapid, on contact with $SO_2$ |
| Trimethylolpropane Triacrylate | Rapid, on contact with $SO_2$ |
| Pentaerylthritol Triacrylate | Rapid, on contact with $SO_2$ |
| Methacrylic Acid | Rapid, on contact with $SO_2$ |
| Methyl Methacrylate | Slow, on bubbling with $SO_2$ |
| 2-Ethylhexyl Methacrylate | Slow, on bubbling with $SO_2$ |
| Hydroxypropyl Methacrylate | Rapid, on contact with $SO_2$ |
| Glycidyl Methacrylate | Rapid, on contact with $SO_2$ |
| Dimethylaminoethyl Methacrylate | Rapid, on contact with $SO_2$ |
| Ethylene Glycol Dimethacrylate | Rapid, on contact with $SO_2$ |
| Trimethylolpropane Trimethacrylate | Rapid, on contact with $SO_2$ |
| Acrylated urethane derived from glycerine 65% in MIAK/HiSol-10 | Rapid, on contact with $SO_2$ |
| N—Methylol Acrylamid in water 60% | Rapid, on contact with $SO_2$ |
| N—[isobutoxymethyl] Acrylamid in Methanol 50% | Rapid, on contact with $SO_2$ |
| Epocryl R-12 Resin (Shell) Acrylated Epoxy 80% in Acetone | Slow, on contact with $SO_2$ |
| UVITHANE 783 (Thiokol/Chem.Div.) Acrylated Urethane Oligomer | Rapid, on contact with $SO_2$ |
| AROPOL 7200 (ASHLAND) unsaturated polyester resin in Acetone 60% | Slow, on contact with $SO_2$ |
| RICON 157 (Colorado Specialty Chemical) an unsaturated hydrocarbon resin in acetone 50% | Slow, on contact with $SO_2$ |
| Hydroxy PBG-2000 (Hystl Co.) an unsaturated hydrocarbon resin in acetone 50% | Slow, on contact with $SO_2$ |

EXAMPLE 2

An unsaturated polymer was prepared by reacting the equivalent of 1 mole of pentane diol and the equivalent of 4 moles of hydroxyethyl acrylate with the equivalent of 3.0 moles of toluene diisocyanate. Dibutyltin dilaurate was used to catalyze the reaction. Based on the solids contents 0.14% catalyst was used. Hydroquinone monoethyl ether is used as an inhibitor. The reaction was carried out in a reaction medium (solvents) consisting of ethylhexyl acrylate and hydroxyethyl acrylate. In carrying out the reaction a mixture of TDI and solvent is charged to a reaction vessel. Pentane diol is added to this mixture followed by the addition of hydroxyethyl acrylate. When the addition of hydroxyethyl acrylate is complete catalyst is added. The reaction is carried out under an air sparge. The reaction proceeded at 40° to 45° C. for 2.1 hours and then the temperature was raised to 80°–85° C. and the reaction was continued 4.3 hours, then 0.03% inhibitor is added and the reaction continued one-half hour. The product was allowed to cool. The product was tested for nonvolatiles and 59.2% were found. This corresponded to a theoretical amount of nonvolatiles of 60%. The viscosity of the product was 6.0 stokes. 20 grams of the unsaturated polymer was then blended with 1.6 grams of acrylic acid, 10.7 grams of diethylene glycol diacrylate, 9.9 grams of trimethylolpropane trimethacrylate and 2.0 grams of vinyl silane. Acrylic acid, diethylene glycol diacrylate and trimethylol propane triacrylate are unsaturated monomers. This solution of unsaturated polymer and unsaturated monomers is referred to as Part I. One gram of t-butylhydroperoxide, the peroxide component of the free radical initiator, was added to the solution of unsaturated polymer and unsaturated monomers.

Wedron 5010 sand (washed and dried fine grained silica sand, AFSGFN 66) was placed in a suitable mixing apparatus. Part I and the peroxide component of the free radical initiator were admixed with the sand until a uniform distribution was achieved. The level of Part I plus peroxide is two percent (2%) based upon weight of sand.

The sand mix was blown into a conventional core cavity or box for making standard tensile briquette test cores known as "dog bones". The dog bone test cores were cured by exposing the cores to the catalytic component of the free radical initiator. The catalytic component is gaseous sulfur dioxide. The cores were exposed to the SO₂ catalyst for approximately ½ second (gas time) and the catalyst was removed by purging with nitrogen for 15 seconds and the core removed from the box. Tensile strengths of the core in psi were 223 out of the box, and 205 after 3 hours and 227 after 24 hours.

"Dog bone" cores similar to those described above were used in shakeout studies with aluminum castings. Seven tensile briquettes (dog bones) were arranged in a mold. The mold incorporated a gating system. The mold is designed to provide hollow castings having a metal thickness of approximately one-quarter inch on all sides. An opening at an end of the casting is provided for removal of the core from the casting. Molten aluminum at approximately 1300° F. prepared from aluminum ingots was poured into the mold. After cooling for about an hour the aluminum castings are broken from the gating system and removed from the mold for shake-out testing.

Shakeout tests are performed by placing a casting in a one gallon container. The container is placed on an agitating mechanism and tumbled for 5 minutes. The weight of the sand core which is removed from the casting in this manner is compared to the initial weight of sand core and a percent shake-out is calculated. Sand remaining in the casting after the agitation described above is removed by scraping and also weighed. The sand core, bonded with the binder described above, was observed to have 100 shake-out. It should be noted that the shakeout test above described is not a standard test. Applicants are not aware of any standard test to measure this quality. It is submitted that the test used is valid for gaining an understanding of the collapsibility of a binder and for comparing the relative collapsibility of binders. The percents given are subject to a degree of variance but are reliable indicators.

| EXAMPLE | 3 |
|---|---|
| Sand | Wedron 5010 at 74 to 78° F. |
| PART I | |
| (a) unsaturated monomer | acrylic acid 1.6 grams diethylene glycol diacrylate 10.7 grams trimethylolpropane trimethacrylate 9.9 grams. |
| (b) unsaturated polymer unsaturated polymer synthesis | Synthesized as described below 20 grams. |
| (i) polyisocyanate, in mole equivalent | TDI 4 |
| (ii) polyol, in mole equivalent | Glycerine -1 |
| (iii) acrylate, in mole equivalent | hydroxyethyl acrylate, 5 |
| (iv) catalyst | dibutyltin dilaurate 0.14% |
| (v) inhibitor | hydroquinone monomethyl ether |
| (vi) solvent in % | ethylhexyl acrylate and hydroxyethyl acrylate, 40% |
| (vii) temp/time °C./hr. | 40° to 45° for 2.13 hrs. then 80° to 85° for 4.8 hrs. |
| (viii) viscosity, stokes | 16.0 |
| (ix) % Nonvolatiles | |
| actual | 63.9 |
| theoretical | 60.0 |
| (c) additive in grams | vinyl silane - 2.0 |
| Free Radical Initiator (Part II) | |
| (a) peroxide component | 2.2% t-butylhydroperoxide |
| (b) catalytic component | SO₂ gas |
| Gas time, sec. | 0.5 |
| Purge time, sec. | 15 with N₂ |
| Tensile Strength, psi | |
| out of box | 178 |
| 3 hr. | 217 |
| 24 hr. | 233 |
| Binder level (Part I + peroxide component) | 2% |
| Metal Cast | Aluminum |
| Shakeout % | 100 |

| | EXAMPLE | |
|---|---|---|
| | 4 | 5 |
| Sand | Wedron 5010 | Wedron 5010 |
| PART I | | |
| (a) unsaturated monomer | Acrylic acid 1.6 grams diethylene glycol diacrylate 10.7 grams trimethylolpropane triacrylate 9.9 grams | Hydroxyethyl acrylate 2.2 grams, dicyclopentenyl acrylate 20.8 grams (N—Methylcarbamoyloxy)ethyl acrylate 17.3 g. |
| (b) unsaturated polymer unsaturated polymer | Synthesized as described below, 20 grams | |

|  | EXAMPLE | |
|---|---|---|
|  | 4 | 5 |
| Sand | Wedron 5010 | Wedron 5010 |
| synthesis | | |
| (i) polyisocyanate, in mole equivalent | TDI, 3 | |
| (ii) polyol, in mole equivalent | Olin 20-265$^a$, 1 $^a$polyoxypropylene glycol | |
| (iii) acrylate, in mole equivalent | hydroxyethyl acrylate, 4 | |
| (iv) catalyst | dibutyltin dilaurate, 0.14% | |
| (v) inhibitor | hydroquinone monomethyl ether | |
| (vi) solvent in % | ethylhexyl acrylate and hydroxyethyl acrylate, 40% | |
| (vii) temp/time °C./hr. | 40° to 45° for 2.1 thru 80° to 85° for 4.75 | |
| (viii) viscosity | 4.2 | |
| (ix) % Nonvolatiles | | |
| actual | 59.2 | |
| theoretical | 60.0 | |
| (c) additive in grams | Vinyl silane 2.0 grams | |
| Free Radical Initiator (Part II) | | |
| (a) peroxide component | 11.3% cumene hydroperoxide. | 2.4% t-butylhydroperoxide. |
| (b) catalytic component | SO$_2$ gas | SO$_2$ gas |
| Gas time, sec. | 0.5 | 1 |
| Purge time, sec. | 15 with N$_2$ | 15 with N$_2$ |
| Tensile Strength, psi | | |
| out of box | 260 | |
| 3 hr. | | 25 |
| 24 hr. | | |
| 48 hr. | 232 | |
| Binder level (Part I + peroxide component) | 2% | 2% |
| Metal Cast | Aluminum | |
| Shakeout % | 100 | |

|  | EXAMPLE | |
|---|---|---|
|  | 6 | 7 |
| Sand | Wedron 5010 | Wedron 5010 |
| PART I | | |
| (a) unsaturated monomer | Pentaerythritol triacrylate 40 grams | acrylic acid 7.2 g, diethylene glycol diacrylate 21.4 g, trimethylolpropane triacrylate 13 g. |
| (b) unsaturated polymer synthesis | | |
| (i) polyisocyanate, in mole equivalent | | |
| (ii) polyol, in mole equivalent | | |
| (iii) acrylate, in mole equivalent | | |
| (iv) catalyst | | |
| (v) inhibitor | | |
| (vi) solvent in % | | |
| (vii) temp/time °C./hr. | | |
| (viii) viscosity | | |
| (ix) % Nonvolatiles | | |
| actual | | |
| theoretical | | |
| (c) additive in gram | | |
| Free Radical Initiator (Part II) | | |
| (a) peroxide component | 2.4% t-butylhydroperoxide. | 2.4% t-butylhydroperoxide. |
| (b) catalytic component | SO$_2$ gas | SO$_2$ gas |
| Gas time, sec. | 0.5 | 1 |
| Purge time, sec. | 15 | 10 |
| Tensile Strength, psi | | |
| out of box | 48 | 130 |
| 3 hr. | | |
| 24 hr. | | |
| Binder level (Part I + peroxide component) | 2% | 2% |
| Metal Cast | | |
| Shakeout % | | |

|  | EXAMPLE | |
|---|---|---|
|  | 8 | 9 |
| Sand | Wedron 5010 | Port Crescent |
| PART (I) | | |
| (a) unsaturated monomer | | Acrylic acid, 3.2 g, diethylene glycol diacrylate 21.4 g, trimethylolpropane trimethacrylate 19.8 g. |
| (b) unsaturated polymer | Synthesized as described below, 40 grams. | Same as Ex. 4. 40 grams |
| (i) polyisocyanate in mole equivalent | TDI, 3 | |
| (ii) polyol, in mole equivalent | Olin 20-265, 1 | |
| (iii) acrylate, in mole equivalent | Hydroxyethyl acrylate, 4. | |
| (iv) catalyst | Dibutyltin dilaurate, 0.14%. | |
| (v) inhibitor | Hydroquinone mono- | |

-continued

| | EXAMPLE | |
|---|---|---|
| Sand | 8 Wedron 5010 | 9 Port Crescent |
| (vi) solvent in % | Pentoxone (93.7) hydroxyethyl acrylate 35% methyl ether 0.07% | |
| (vii) temp/time °C./hr. | 40° to 45° for 2 hrs. then 20° to 85° for 4 | |
| (viii) viscosity | Thixotropic after 3 days. | |
| (ix) % Nonvolatiles actual | 63.1 | |
| theoretical | 65 | |
| (c) additive in gram | Vinyl Silane A-172 2.0 grams Acrylic Acid 1.6 grams. | Vinyl Silane |
| Free Radical Initiator (Part II) | | |
| (a) peroxide component | (90%) t-butyl hydroperoxide 2.2% | t-butyl peracetate (6 grams) |
| (b) catalytic component | SO$_2$ gas | Heat 450° for 90 Sec. |
| Gas time, sec. | 0.5 | |
| Purge time, sec. | 15 with N$_2$ | |
| Tensile Strength, psi | | |
| out of box | 53 | 75 |
| 3 hr. | 93 | |
| 24 hr. | | |
| Cold strength | 155 | 160 |
| Binder level (Part I + peroxide component) | 2% | 2% |
| Metal Cast | | |
| Shakeout % | | |

| | EXAMPLE | |
|---|---|---|
| Sand | 10 Wedron 5010 | 11 Wedron 5010 |
| PART I | | |
| (a) unsaturated monomer | Acrylic acid 1,6 grams, trimethylolpropane triacrylate 9.9 g. | Same as Ex. 10 |
| (b) unsaturated polymer unsaturated polymer synthesis | Synthesized as described below, 20 grams. | |
| (i) polyisocyanate mole equivalent | TDI, 3.5 | |
| (ii) polyol, in mole equivalent | glycerine diethylene glycol mixture (1:1),1 | |
| (iii) acrylate, in mole equivalent | Hydroxyethyl acrylate 4.5 | |
| (iv) catalyst | dibutyltin dilaurate 0.14% | |
| (v) inhibitor | hydroquinone monomethyl ether 0.07% | |
| (vi) solvent in % | ethylhexyl acrylate + hydroxyethyl acrylate (4:6) 40% | |
| (vii) temp/time °C./hr. | 40 to 45° for 2 hrs. then 80 to 85° for 4.8 hours. | |
| (viii) viscosity | 10 stokes | |
| (ix) % Nonvolatiles actual | 59.9 | |
| theoretical | 60.0 | |
| (c) additive in gram | Vinyl silane A-172, 2 HiSol 10 10.7. | |
| Free Radical Initiator (Part II) | | |
| (a) peroxide component | 70% t-butyl hydroperoxide 2.2% | |
| (b) catalytic component | SO$_2$ gas | ½% SO$_2$ gas in N$_2$ carrier gas |

-continued

| | EXAMPLE | |
|---|---|---|
| Sand | 10 Wedron 5010 | 11 Wedron 5010 |
| Gas time, sec. | 0.5 | ½ |
| Purge time, sec. | 15 with N$_2$ gas | None |
| Tensile Strength, psi | | |
| out of box | 228 | 70 |
| 3 hr. | 227 | 122 |
| 24 hr. | 257 | 223 |
| Binder level (Part I + paroxide component) | 2% | 1.5 |
| Metal Cast | Aluminum | |
| Shakeout % | 100 | |

| EXAMPLE | 12 |
|---|---|
| Sand | Wedron 5010 |
| PART I | |
| (a) unsaturated monomer | Acrylic acid 1.6 g. diethylene glycol 5.49 trimethylol propane triacrylate 9.9 |
| (b) unsaturated polymer unsaturated polymer synthesis | Synthesized as directed below, 20 grams. |
| (i) polyisocyanate mole equivalents | 4 |
| (ii) polyol, in mole equivalents | glycerine 1 |
| (iii) acrylate, in mole equivalents | hydroxyethyl acrylate |
| (iv) catalyst | dibutyltin dilaurate 0.14 |
| (v) inhibitor | hydroquinone monomethyl ether 0.03 |
| (vi) solvent in % | methyl isoamyl ketone, HiSol 10 (65:35) 35% |
| (vii) temp/time °C./hr | 40 to 45° for 1.75 hours then 80 to 85° for 4.5 hours |
| (viii) viscosity, stokes | 10 |
| (ix) % Nonvolatiles actual | 64.1 |
| theoretical | 65 |
| (c) additive in grams | Vinyl silane 2.0 HiSol 10 5.3 |
| Free Radical Initiator (Part II) | |
| (a) peroxide component | 2.2% t-butylhydroperoxide - 70 |
| (b) catalytic component | 1% SO$_2$ gas in N$_2$ carrier gas |
| Gas time, sec. | 20 |
| Purge time, sec. | None |
| Tensile Strength, psi | |
| out of box | 218 |
| 3 hr. | 157 |
| 24 hr. | 233 |
| Binder level (Part I + peroxide component) | 1.5 |
| Metal Cast | Aluminum |
| Shakeout % | 100 |

| EXAMPLE | 13 |
|---|---|
| Sand | Wedron 5010 |
| PART I | |
| (a) unsaturated monomer | Acrylic acid 1.6 g. diethylene glycol 5.49 trimethylol propane triacrylate 9.9 |
| (b) unsaturated polymer unsaturated polymer synthesis | Synthesized as described below, 20 grams. |
| (i) polyisocyanate mole equivalents | 4 |
| (ii) polyol, in mole equivalents | glycerine 1 |
| (iii) acrylate, in mole equivalents | hydroxyethyl acrylate |
| (iv) catalyst | dibutyltin dilaurate 0.14 |
| (v) inhibitor | hydroquinone monomethyl ether 0.03 |
| (vi) solvent in % | methyl isoamyl ketone, HiSol 10 (65:35) 35% |

-continued

| EXAMPLE | 13 |
|---|---|
| Sand | Wedron 5010 |
| (vii) temp/time °C./hr | 40 to 45° for 1.75 hours then 80 to 85° for 4.5 hours |
| (viii) viscosity, stokes | 10 |
| (ix) % Nonvolatiles | |
| actual | 64.1 |
| theoretical | 65 |
| (c) additive in grams | Vinyl silane 2.0 |
| | Hi Sol 10 5.3 |
| Free Radical Initiator (Part II) | |
| (a) peroxide component | 2.2% t-butylhydroperoxide - 70 |
| (b) catalytic component | SO$_2$ gas |
| Gas time, sec. | 0.5 |
| Purge time, sec. | 15 with air |
| Tensile Strength, psi | |
| out of box | 177 |
| 3 hr. | 95 |
| 24 hr. | 150 |
| Binder level (Part I + peroxide component) | 1.5 |
| Metal Cast | Aluminum |
| Shakeout % | 100 |

We claim:

1. A process for forming shaped foundry articles comprising:
   (a) distributing on a foundry aggregate a bonding amount of a binder material, said binder material comprising a reactive ethylenically unsaturated polymer; wherein said polymer is selected from the group of epoxy arcylate reaction products, polyester/urethane/acrylate reaction products, polyether acrylate, polyester acrylates, or mixtures thereof;
   (b) shaping the aggregate into the desired foundry article; and
   (c) polymerizing the binder material by means of a free radical initiator, said initiator comprising an organic peroxide and a catalytic agent wherein said catalytic agent comprises gaseous sulphur dioxide.

2. The process of claim 1 wherein the aggregate is sand.

3. The process of claim 2 wherein the binder material comprises a mixture wherein the ethylenically unsaturated polymer is mixed with at least one other ethylenically unsaturated polymer.

4. The process of claim 2 wherein the unsaturated polymer is an oligomer.

5. The process of claim 1 wherein the unsaturated polymer is an adduct.

6. A process for forming shaped foundry articles comprising:
   (a) distributing on a foundry aggregate a bonding amount of a binder material, said binder material comprising an acrylated urethane polymer;
   (b) shaping the aggregate into the desired foundry article; and
   (c) polymerizing the binder material by means of a free radical initiator, said initiator comprising an organic peroxide and a catalytic agent wherein said catalytic agent comprises gaseous sulphur dioxide.

7. The process of claim 6 wherein said binder material also includes a reactive ethylenically unsaturated monomer.

8. The process of claim 7 wherein said unsaturated monomer includes a polyfunctional acrylate.

9. The process of claim 7 wherein said unsaturated monomer includes a member selected from the group of pentaerythritol triacrylate, trimethylolpropane triacylate, 1,6-hexanediol diacrylate, tetraethylene glycol diacrylate, and mixtures thereof.

10. The process of claim 8 wherein said acrylated urethane is from reactants comprising toluene diisocyanate, a polyol, and hydroxyethyl acrylate.

11. The process of claim 10 wherein said polyol includes glycerine.

12. The process of claim 11 wherein said polyol also includes diethylene glycol.

13. The process of claim 12 wherein said monomer also includes acrylic acid.

14. The process of claim 12 wherein the binder is in a non-anaerobic environment when contacted with said gaseous sulphur dioxide.

15. The process of claim 6 wherein the binder is in a non-anaerobic environment when contacted with said gaseous sulphur dioxide.

16. The process of claim 6 wherein the aggregate is sand.

17. The process of claim 1 wherein said binder material includes an epoxy acrylate reaction product.

18. The process of claim 1 wherein said binder material includes an polyester/urethane/acylate reaction product.

19. The process of claim 1 wherein said binder material includes an polyether acrylate reaction product.

20. The process of claim 1 wherein said binder material includes an polyester acrylate reaction product.

* * * * *